(12) United States Patent
Gagnon

(10) Patent No.: US 6,598,619 B2
(45) Date of Patent: Jul. 29, 2003

(54) EXHAUST GAS REGULATOR INCLUDING A RESILIENT COUPLING

(75) Inventor: Frederic Gagnon, Chatham (CA)

(73) Assignee: Siemens VDO Automotive, Inc. (CA)

( * ) Notice: Subject to any disclaimer, the term of this patent is extended or adjusted under 35 U.S.C. 154(b) by 0 days.

(21) Appl. No.: 09/957,616

(22) Filed: Sep. 21, 2001

(65) Prior Publication Data

US 2003/0056836 A1 Mar. 27, 2003

(51) Int. Cl.[7] .............................................. F16K 49/00
(52) U.S. Cl. ...................... 137/554; 137/338; 137/375; 123/323; 251/129.11
(58) Field of Search ................... 137/554, 375, 137/338; 251/129.11; 123/323

(56) References Cited

U.S. PATENT DOCUMENTS

| | | | | |
|---|---|---|---|---|
| 3,859,619 A | * | 1/1975 | Ishihara et al. | 137/554 |
| 5,148,678 A | * | 9/1992 | Ueda et al. | 137/375 |
| 5,494,255 A | * | 2/1996 | Pearson et al. | 251/129.15 |
| 5,718,259 A | * | 2/1998 | Miyake et al. | 137/338 |
| 5,975,118 A | * | 11/1999 | Ulicny et al. | 137/338 |

* cited by examiner

Primary Examiner—A. Michael Chambers

(57) ABSTRACT

A valve that includes a wall, a closure member, a motive force device, a coupling member, and a spacer. The wall defines a flow passage that is disposed along a longitudinal axis. The closure member is disposed in the flow passage and includes a first shaft that extends along a first axis that is oblique to the longitudinal axis. The closure member is rotatable on the first axis between a first position that substantially prevents flow through the flow passage and a second position that generally permits flow through the flow passage. The motive force device rotates the closure member between the first position and the second position, and includes a second shaft that is rotatable on a second axis. The coupling member connects the first and second shafts to convey rotation from the device to the closure member. The coupling member is resilient with respect to the first and second shafts. And the spacer insulates the device with respect to the wall, and generally defines a volume that contains the coupling member.

16 Claims, 6 Drawing Sheets

EXHAUST GAS REGULATOR INCLUDING A RESILIENT COUPLING

BACKGROUND OF THE INVENTION

It is believed that an Exhaust Gas Regulator ("EGR") consists of, among other components, a valve which is inserted into an exhaust gas flow passage. The valve is believed to control the flow rate of exhaust gas through the passage.

An EGR is also believed to comprise an actuator shaft that is connected to and manipulates the valve, and a motor that drives the actuator shaft. It is believed that the position of the valve within the exhaust gas flow passage subjects the valve to very high temperatures. It is further believed that the actuator shaft conducts heat energy from the valve to the motor, thereby increasing the operational temperature of the motor. It is yet further believed this temperature increase can adversely affect the motor's performance and possibly damage the motor.

SUMMARY OF THE INVENTION

The present invention provides a valve that includes a wall, a closure member, a motive force device, a coupling member, and a spacer. The wall defines a flow passage that is disposed along a longitudinal axis. The closure member is disposed in the flow passage and includes a first shaft that extends along a first axis that is oblique to the longitudinal axis. The closure member is rotatable on the first axis between a first position that substantially prevents flow through the flow passage and a second position that generally permits flow through the flow passage. The motive force device rotates the closure member between the first position and the second position, and includes a second shaft that is rotatable on a second axis. The coupling member connects the first and second shafts to convey rotation from the device to the closure member. The coupling member is resilient with respect to the first and second shafts. And the spacer insulates the device with respect to the wall, and generally defines a volume that contains the coupling member.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
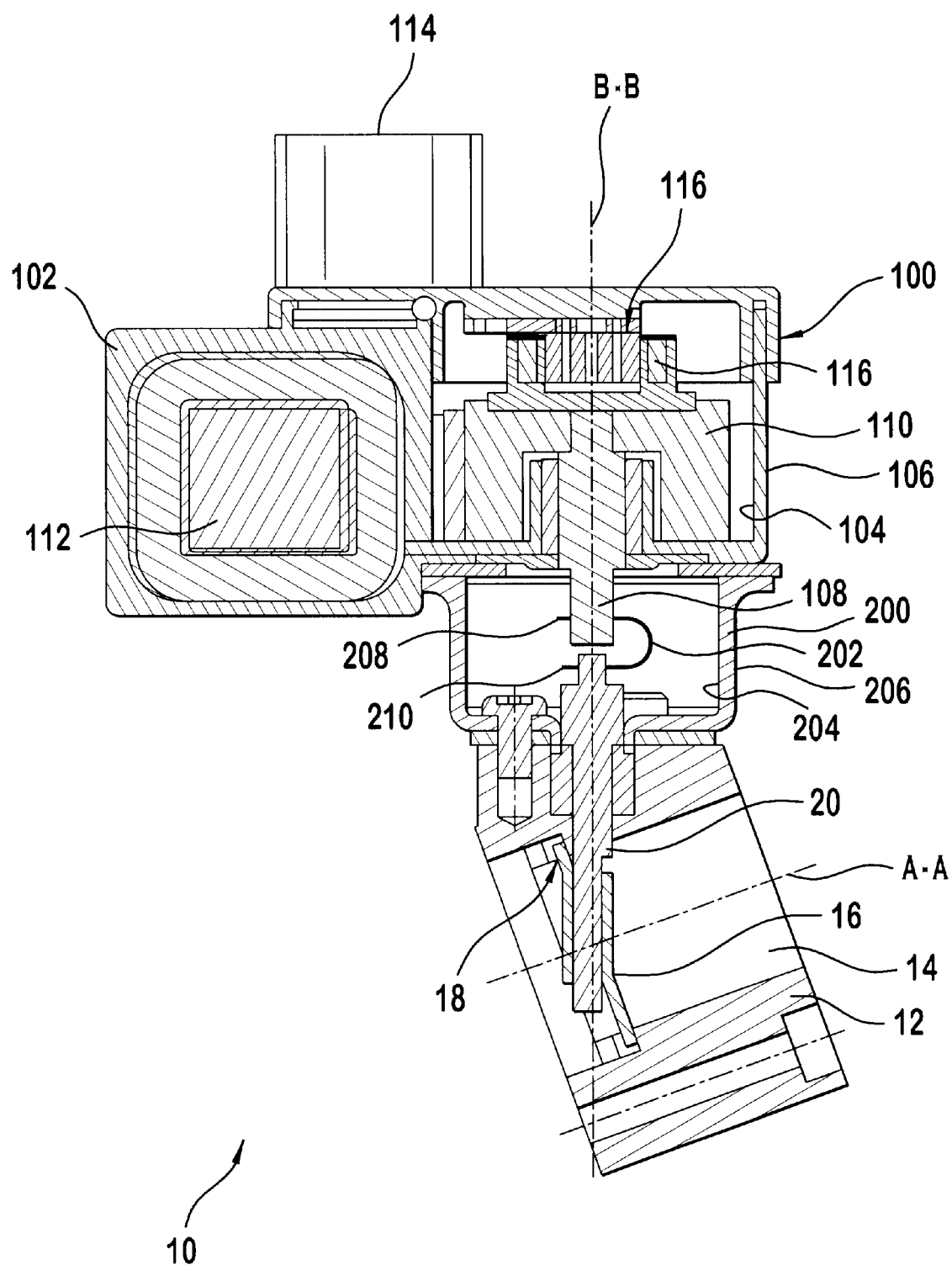
FIG. 1 is a schematic illustration of a regulator valve.

FIG. 1 shows a regulator valve 10 according to a preferred embodiment. The regulator valve 10 can be operated with a motive force device 100 that can include an electric motor as shown, for example, in FIGS. 2A, 2B, and 2C.

The regulator valve 10 includes a wall 12 defining a flow passage 14 disposed along a longitudinal axis A—A. A closure member 16 is disposed in the flow passage 14 for rotation about an axis B—B, which is oblique to the longitudinal axis A—A. The closure member 16 is movable, e.g., rotatable, to a first position to substantially prevent flow through the flow passage 14, and the closure member 16 is also movable to a second position to generally permit flow through the flow passage 14. The wall 12 can include a boss portion with a seal 18 for contiguously engaging the closure member 16 in the first position. The closure member 14 can be a butterfly valve, which can be coupled to a shaft 20 extending along the axis B—B.

The motive force device 100 is mounted with respect to the wall 12 and connected to the closure member 16 such that it can rotate the closure member 16 between the first position and the second position about the axis B—B. The motive force device 100 can be an electric stepper motor, an electric torque motor, or another device that provides a motive force. The motive force device 100 can include a housing 102 having an interior surface 104 and an exterior surface 106. The interior surface 104 can enclose a driveshaft 108 that is coupled to a rotor 110, and can surround a stator 112.

Preferably, the drive shaft 108 and rotor 110 rotate on the axis B—B. The stator 112 of the electric motor may, however, be disposed in the interior surface 104 of the housing 102 so as to be misaligned with the axis B—B. The misalignment can include being offset relative to the axis B—B, being relatively obliquely oriented, or a combination thereof.

The housing 102 can include an electrical connector 114 disposed on the exterior surface 106 of the housing 102 for electrically connecting the motive force device 100 to a power source (not shown).

Figure 2A:
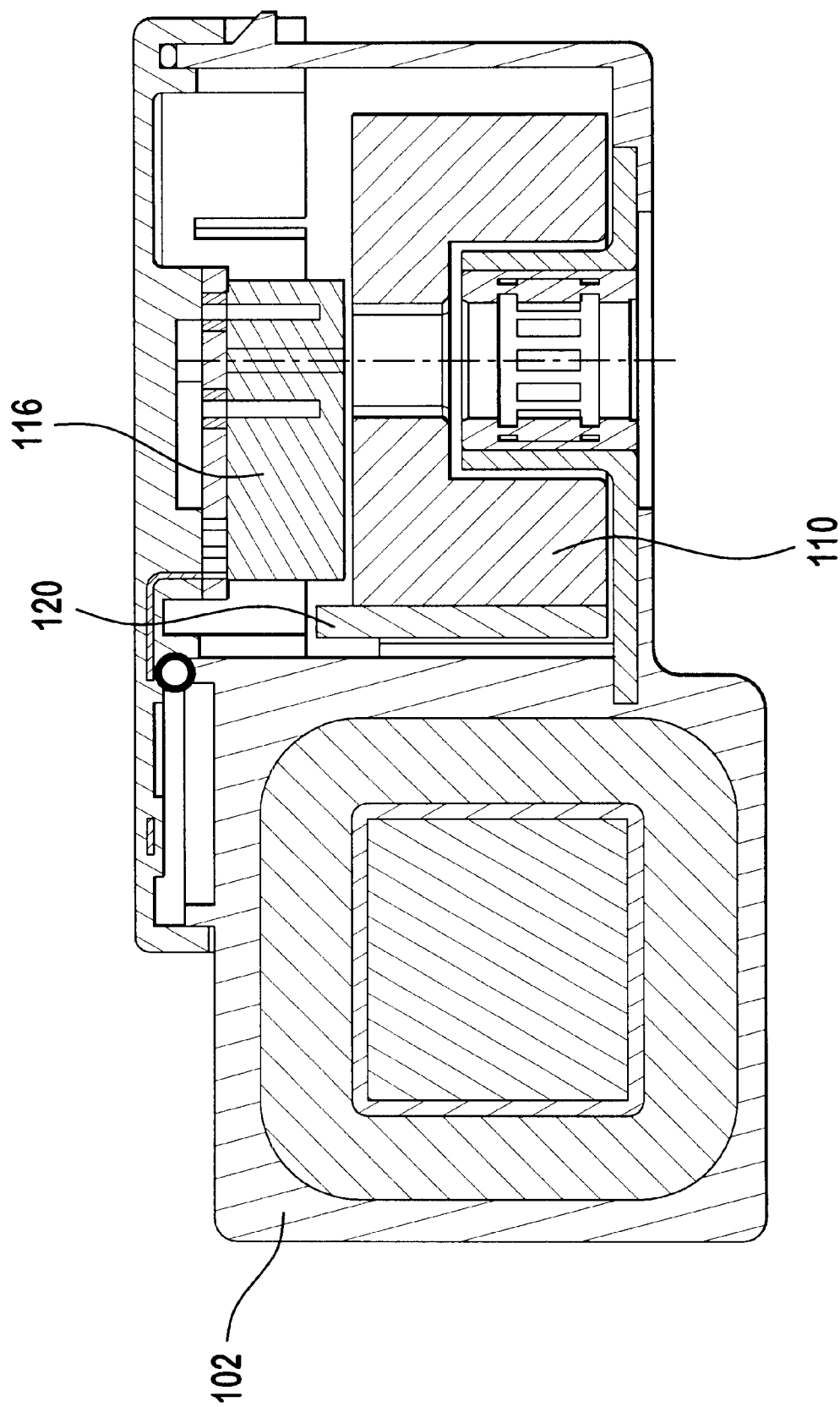
FIGS. 2A, 2B, and 2C are cross-sectional views showing a variation of a sensor for a motive force device of the regulator valve illustrated in FIG. 1.
Figure 2B:
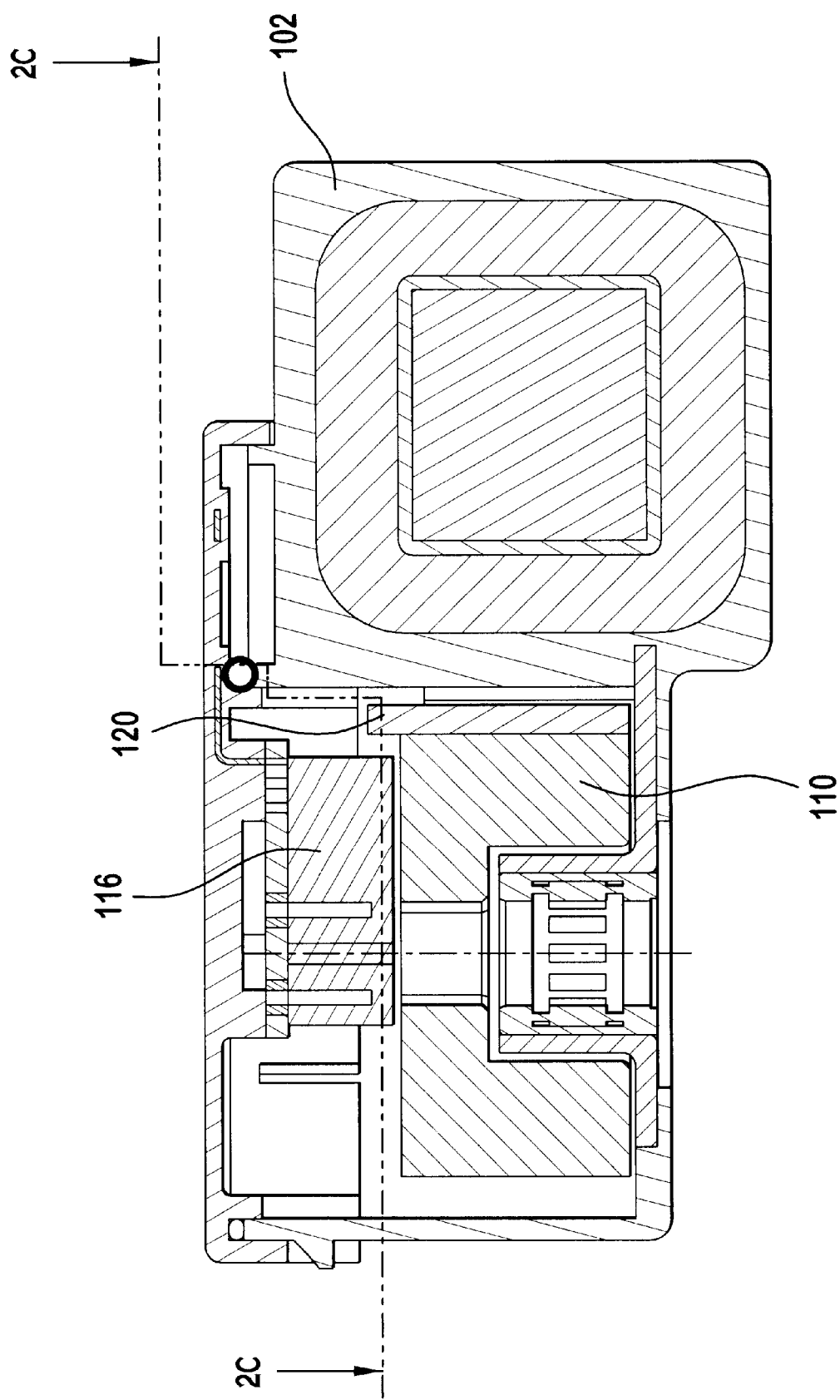
Figure 2C:
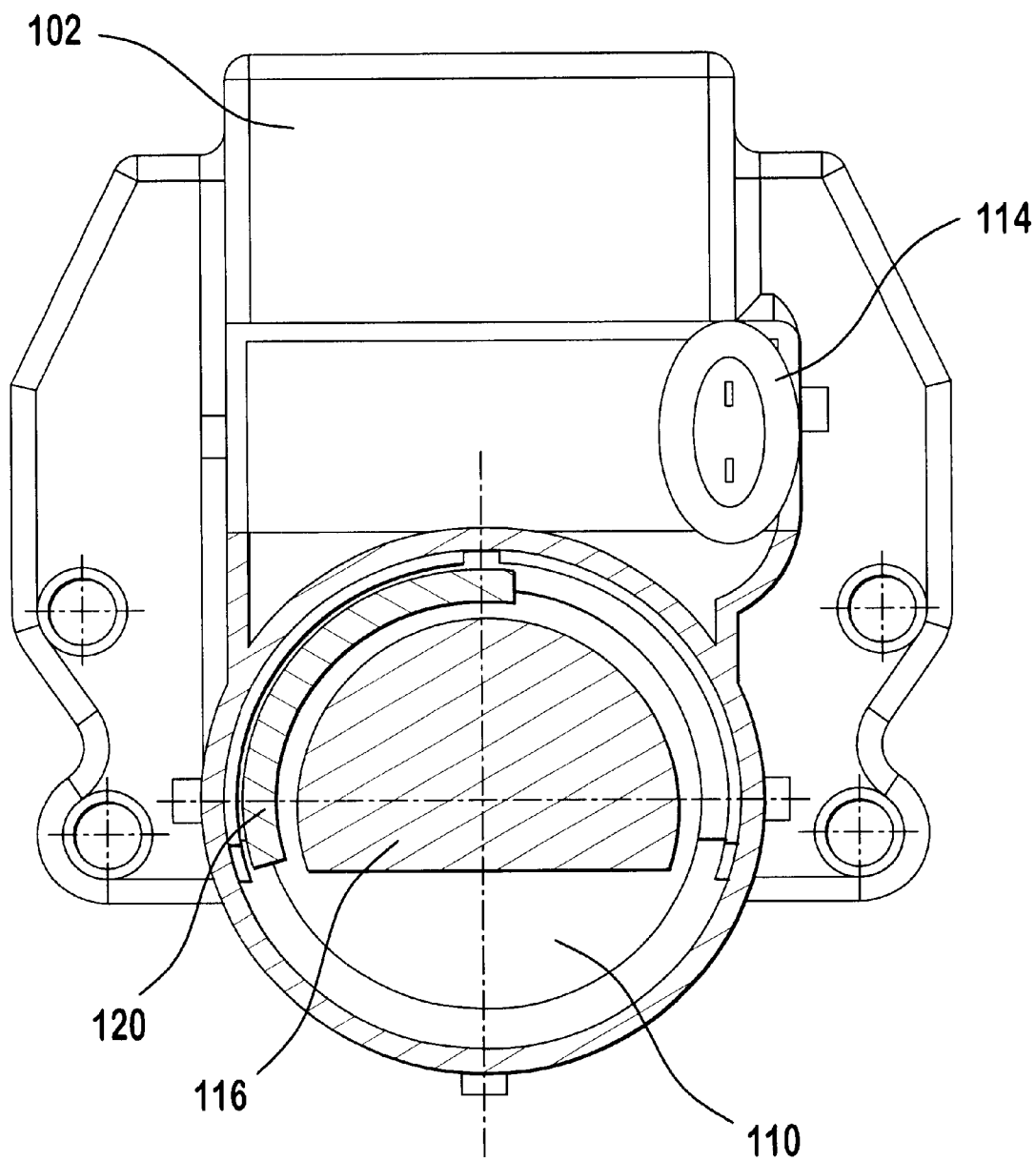

The motive force device 100 can also have a sensor disposed in the housing 102. The sensor can include a sensor rotor part 118, which may be coupled to the driveshaft 108, and a sensor stator part 116, which is disposed proximate the sensor rotor part 118. As shown in FIG. 1, the sensor rotor part 118 can be an annular magnetic member. A variation of the sensor is illustrated in FIGS. 2A, 2B, and 2C. In lieu of an annular magnetic member, the rotor 110 can include a magnetic part 120 that extends generally parallel with respect to the axis B—B and projects beyond an axial surface of the rotor 110. The stator 112 can include the sensor stator part 116, e.g., a Hall effect sensor, which is supported by the housing 102 such that the magnetic portion 120 rotates about the sensor stator part 116. FIG. 2B is a mirror of FIG. 2A.

The regulator valve 10 also comprises a spacer 200 that supports the motive force device 100 with respect to the wall 12. The spacer 200 can have an inner wall 204 and an outer wall 206. The inner wall 204 defines a volume that contains a coupling member 202. The dimensions of the spacer 200 and the volume defined by the spacer 200 can be configured such that, depending on the operating temperature of the exhaust gas, the heat that is transferred from the exhaust gases in the flow passage 14 to the motive device 100 can be within a selected range of heat energy over the product of area and time, i.e., $BTU/(ft^2*hour)$ or $kW/m^2$.

The coupling member 202 can have a drive portion 208 that contiguously engages the driveshaft 108 and have a driven portion 210 that contiguously engages the shaft 20. The coupling member 202 performs a number of functions in addition to conveying force, e.g., torque, from the motive force device 100 to the closure member 16. The coupling member 202 can accommodate misalignment between the driveshaft 108 and the shaft 20. As discussed above, misalignment can include offset axes, obliquely related axes, or a combination of both. Preferably, the coupling member 202 is constructed of a resilient material, e.g., metal, that provides flexibility in order to accommodate the misalignment. The coupling member 202 can also thermally separate the driveshaft 18 and the shaft 20. In particular, the coupling member 202 can be constructed to minimize heat conduction from the shaft 20 to the driveshaft 108, and to maximize heat convection from the coupling member 202 to the volume defined by the inner wall 204. Preferably, the coupling member 202 is constructed with thin walls that provide a small cross-sectional area and a large surface area. The coupling member 202 can also "axially" bias the shaft 20 with respect to the driveshaft 108. Specifically, the coupling member 202 can apply a force that acts along the axis of the shaft 20 and concurrently apply a reaction force that acts along the axis of the driveshaft 108. These oppositely acting forces tend to eliminate looseness and avoid lost motion between the driveshaft 108 and the shaft 20.

The coupling member 202 can have a variety of configurations. For example, as shown in FIG. 1, the coupling member 202 can have a U-shaped configuration that extends between the drive portion 208 and the driven portion 210.

Figure 3:
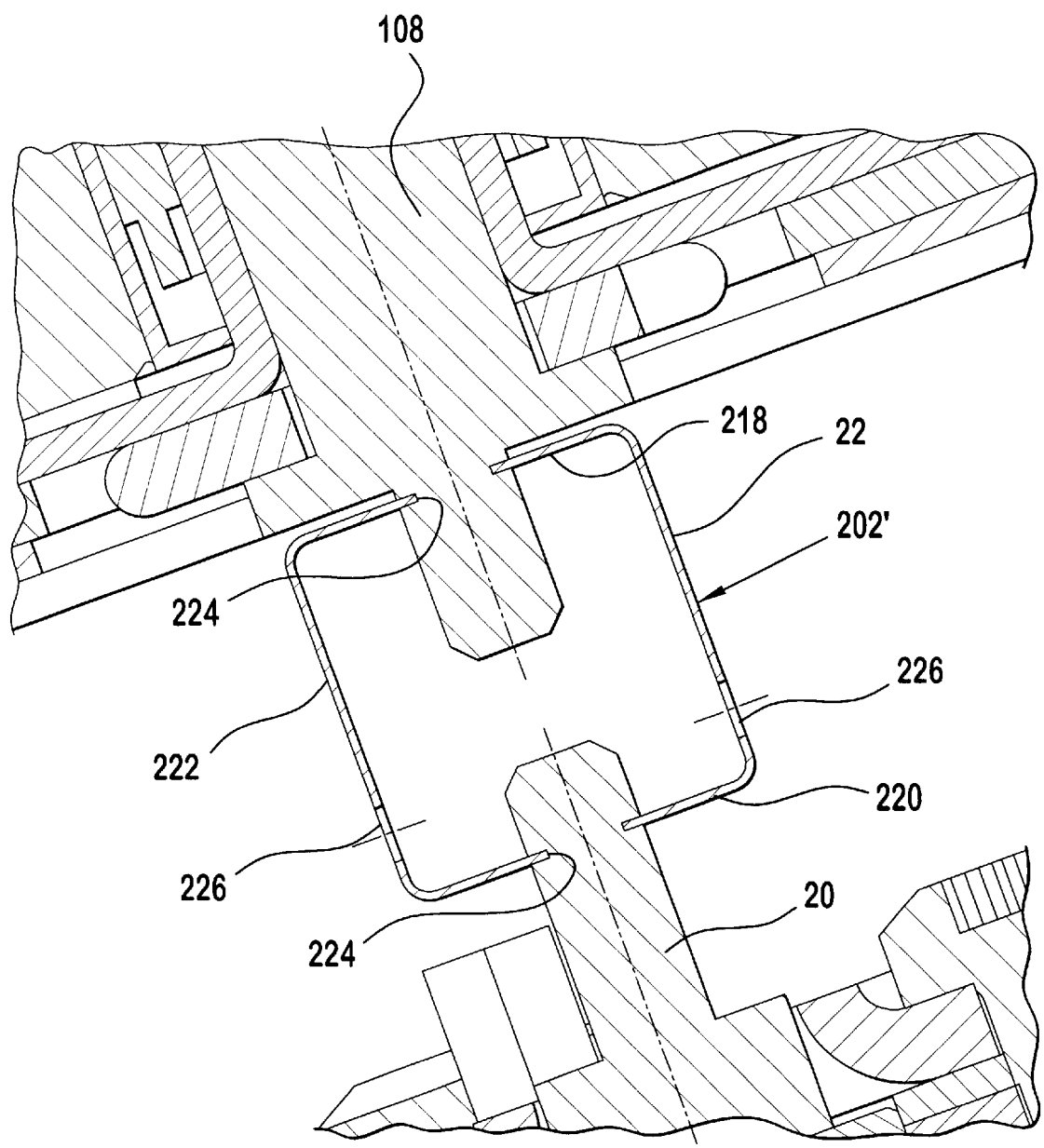
FIG. 3 is a partial cross-sectional view showing a variation of a coupling member for the regulator valve illustrated in FIG. 1.
Figure 4:
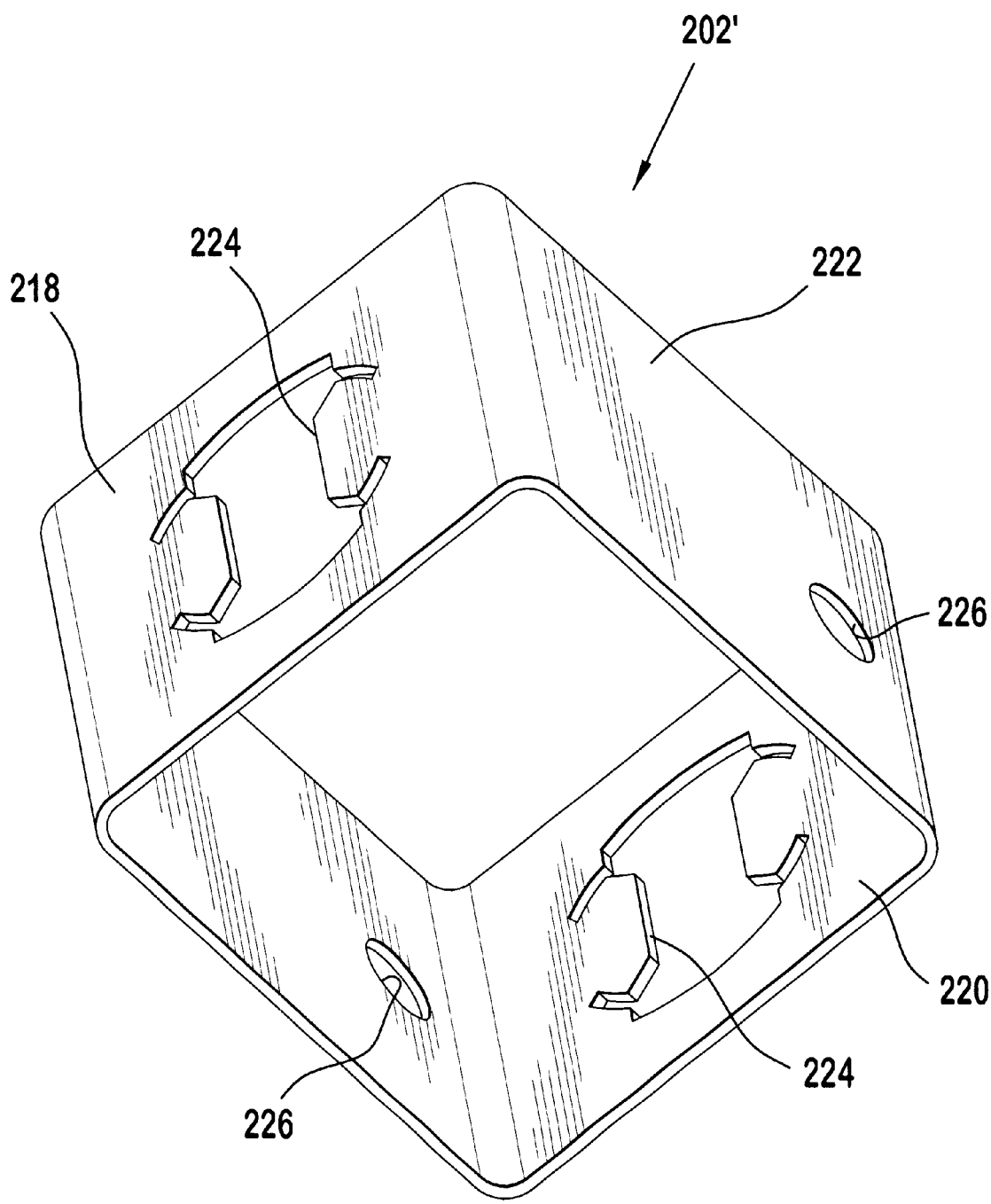
FIG. 4 is a detail view of the coupling member shown in FIG. 3.

Referring now to FIGS. 3 and 4, wherein the same reference numerals identify similar features as described with respect to FIG. 1, an alternatively configured coupling member 202' can have an open-ended "box" shape. In particular, the coupling member 202' includes four sides: a drive side 218, a driven side 220, and two connecting sides 222. The drive side 218 and the driven side 220 each include an aperture 224 that contiguously engages, respectively, the driveshaft 108 and the shaft 20. Preferably, these apertures 224 have a "spider" shape that enables the coupling member 202' to grip the driveshaft 108 or the shaft 20, and yet still allow for movement that accommodates the misalignment that is discussed above with respect to the coupling member 202. Moreover, such spider-shaped apertures 224 facilitate applying the opposing axial forces that are also described above with respect to the coupling member 202. As it is used herein, a "spider-shaped aperture" refers to a central opening and a plurality of slots extending outward from the central opening. The connecting sides 222 can also include holes 226 that can enhance the torsional resilience of the coupling member 202', thereby further tending to eliminate looseness and avoid lost motion between the driveshaft 108 and the shaft 20.

In operation, the heat transferred to the motive force device 100 is believed to be decreased by the spacer 200, which includes the defined volume, that couples the wall 12 to the housing 102; and by the member that couples the driveshaft 108 to the shaft 20. Also during operation of the valve 10, undesirable hysteresis due to misalignment can also be reduced or eliminated by member that couples the driveshaft 108 to the shaft 20.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A valve comprising:

a wall defining a flow passage disposed along a longitudinal axis;

a closure member being disposed in the flow passage and including a first shaft extending along a first axis oblique to the longitudinal axis, the closure member being rotatable on the first axis between a first position substantially preventing flow through the flow passage and a second position generally permitting flow through the flow passage;

a motive force device rotating the closure member between the first position and the second position, the device including a second shaft being rotatable on a second axis;

a coupling member connecting the first and second shafts to convey rotation from the device to the closure member, the coupling member being resilient with respect to the first and second shafts; and a spacer insulating the device with respect to the wall, and the spacer generally defining a volume containing the coupling member.

2. The valve according to claim 1, wherein the coupling member comprises a first portion and a second portion, the first portion contiguously engages and rotates with the first shaft, and a second portion contiguously engages and rotates with the second shaft.

3. The valve according to claim 2, wherein the first portion comprises a first spider-shaped aperture receiving the first shaft, and the second portion comprises a second spider-shaped aperture receiving the second shaft.

4. The valve according to claim 2, wherein the coupling member comprises a connecting portion coupling the first and second portions.

5. The valve according to claim 4, wherein the connecting portion consists of a single bight coupling the first and second portions.

6. The valve according to claim 4, wherein the connecting portion comprises a plurality of elements, each of the plurality of elements independently couple the first and second portions.

7. The valve according to claim 1, wherein the coupling member comprises a first portion, a second portion, a third portion, and a fourth portion, the first portion contiguously engages and rotates with the first shaft, the second portion contiguously engages and rotates with the second shaft, the third portion connects the first and second portions, the fourth portion connects the first and second portions, the first portion is generally parallel and spaced with respect to the second portion, and the third portion is generally parallel and spaced with respect to the fourth portion.

8. The valve according to claim 7, wherein the first and second portions each extend a first length between the third and fourth portions, the third and fourth portions each extend a second length between the first and second portions, and the first and second portions extend perpendicular with respect to the third and fourth portions.

9. The valve according to claim 1, wherein the first and second axes are misaligned.

10. The valve according to claim 1, wherein the coupling member thermally separates the first and second shafts.

11. The valve according to claim 1, wherein the coupling member comprises a resilient metal member.

12. The valve according to claim 1, wherein the closure member comprises a butterfly valve, and the device comprises an electric torque motor.

13. The valve according to claim 12, wherein the electric torque motor comprises a stator and a rotor.

14. The valve according to claim 1, further comprising:
a sensor detecting the angular position of the rotor with respect to the stator.

15. The valve according to claim 1, wherein the valve is an exhaust back pressure valve.

16. The valve according to claim 1, wherein the valve is an exhaust gas recirculation valve.

* * * * *